United States Patent [19]

Mesh et al.

[11] 3,814,934

[45] June 4, 1974

[54] PULSE GENERATING APPARATUS RESPONSIVE TO SHAFT ROTATION

[75] Inventors: Theodore Julius Mesh, Greensboro, N.C.; George Thomas Devine, Hutton, England

[73] Assignee: Gilbert & Barker Manufacturing Co., New York, N.Y.

[22] Filed: Nov. 10, 1972

[21] Appl. No.: 305,274

[52] U.S. Cl. ........ 250/231 SE, 250/237 R, 324/175
[51] Int. Cl. ............................................. G01d 5/34
[58] Field of Search... 324/175; 250/231 SE, 231 R, 250/237 R, 237 G; 235/92; 340/263

[56] References Cited
UNITED STATES PATENTS

| | | | |
|---|---|---|---|
| 3,098,152 | 7/1963 | Von Mathes | 324/175 |
| 3,304,434 | 2/1967 | Koster | 250/231 SE |
| 3,310,798 | 3/1967 | Wingate | 250/231 SE |
| 3,323,120 | 5/1967 | Uehlin | 250/231 SE |
| 3,394,264 | 7/1968 | Busey | 324/175 |
| 3,436,655 | 4/1969 | Lundgreen | 324/175 |
| 3,693,023 | 9/1972 | Wasserman | 324/175 |
| 3,725,665 | 4/1973 | Talmo | 250/231 SE |
| 3,728,551 | 4/1973 | Culver | 250/231 SE |

Primary Examiner—Archie R. Borchelt
Assistant Examiner—D. C. Nelms
Attorney, Agent, or Firm—Tipton D. Jennings

[57] ABSTRACT

An embodiment of the pulse generating apparatus which is disclosed includes an optical encoder and accompanying electrical circuitry designed to prevent operational vibration and backlash from causing the generation of false pulses. The encoder includes a pair of light sources spaced from and aligned with a pair of light detectors. The space between these devices is intercepted by a rotating slotted disc. A flip-flop is connected to the outputs of the detectors so that it is first set and then reset by the light pulse which passes to each detector in response to the passage of each slot in the disc. A minimum hysteresis, namely 2°, is incorporated into the design of the pulse generating apparatus to insure against undesired setting or resetting of the flip-flop by backlash or vibration.

7 Claims, 4 Drawing Figures

PATENTED JUN 4 1974　　　　　　3,814,934

PULSE GENERATING APPARATUS RESPONSIVE TO SHAFT ROTATION

BACKGROUND OF THE INVENTION

The present invention relates to apparatus for generating electrical pulses and, more particularly, to improved apparatus for generating a preset number of pulses for each revolution of a shaft or similar device.

It is known to generate and count pulses as a measure of shaft rotation. One common technique uses an optical encoder associated with the shaft. Typically, a disc is mounted on the shaft and is provided with a ring of equally-spaced slots. A light source and light detector are aligned on opposite sides of the disc such that a pulse of light is beamed to the detector as each slot passes between the light source and light detector during rotation of the disc. Each pulse of light which is received by the detector is processed and counted. The total count is thus proportional to the number of complete and partial rotations of the shaft.

It has been found that vibration and backlash of the shaft during its operation can cause errors in the number of pulses which are generated. For example, once a slot has passed beyond the aligned light source and detector so that the light beam between the two devices is interrupted, any bounce, vibration, or oscillation of the shaft which causes the disc slot to move partially or wholly back into the source/detector line will permit another light beam to strike the detector to generate an extra pulse. Thus, two and perhaps more pulses are generated by this single slot when, in fact, only one pulse should have occurred. The result is that a larger count is obtained and the shaft erroneously appears to have rotated a greater amount than is actually the case.

The U.S. Pat. to Lundgreen Nos. 3,436,655 and Busey 3,394,264 are representative of patents disclosing apparatus directed to overcoming the problem of erroneous pulse generation caused by vibration or backup of the shaft. In Lundgreen, a pair of light sources beam light through a slotted disc to a pair of photocells. A flip-flop is connected to the photocells to be set and reset respectively by pulses out of the photocells. When jitter or shaft backup causes multiple light beams to strike either one of the pair of photocells, the multiple electrical impulses which are generated will be applied to the Set input of a flip-flop which is already in the set state or to the Reset input of a flip-flop which is already in the reset state. Thus, the flip-flop does not change state and its output is not affected by the multiple pulses of light which have reached one of the photocells.

The optical encoder of the Busey patent is similar to that of Lundgreen except that a single light source is provided which projects light through a slotted disc to two or more photocells. A stationary slotted mask is interposed between the disc and photocell. The spacing of the mask slots permits light to pass only to one photocell at a time. A flip-flop is again employed at the input of the processing circuit so that multiple pulse generation at the photocell caused by jitter or the like will not generate more than one output pulse from the flip-flop.

SUMMARY OF THE PRESENT INVENTION

The pulse generating apparatus of the present invention incorporates an optical encoder in conjunction with a rotating shaft similar in general respects to the prior art noted above. In a disclosed embodiment, a slotted disc is employed together with a pair of light sources and a pair of light detectors spaced across the disc, this arrangement being to overcome erroneous multiple pulse generation caused by vibration or backlash of the shaft.

As an improvement upon the prior art, the present invention is directed toward the incorporation of a minimum hysteresis, or immunity to backlash, into the shaft in order to increase the accuracy of the shaft rotation measurement under actual operational conditions. Such minimum hysteresis has been found to be critical where the shaft is subjected to stop/start rotation or abrupt increases or decreases in the shaft rotational speed. Under such conditions, a substantial backlash of the shaft and thereby the disc can occur. However, if the pulse generating apparatus is constructed in accordance with the teachings of the present invention, there will be sufficient hysteresis to provide accurate performance even under these adverse operational conditions.

In accordance with the purposes of the invention, as embodied and broadly described herein, the invention comprises an optical encoder including a disc coupled to said shaft, said disc including a plurality of openings formed therein and equally spaced in a circle about said disc, a pair of radiant energy sources positioned on one side of said disc, a pair of radiant energy detectors positioned on the opposite side of said disc, each of said pair of radiant energy sources being in optical alignment with a respective one of said pair of radiant energy detectors, and means for confining the width of the beams radiated by said radiant energy sources, said confining means having a pair of spaced apertures through which the radiant energy beams are directed toward said detectors, a bistable device connected to the output of said pair of radiant energy detectors, means for processing electrically the outputs of said bistable device to provide pulses proportional in number to shaft rotation, the effective spacing between the apertures being approximately one-half the spacing between adjacent openings, and the spacing between said openings and the sizing of said openings and apertures being selected so that the angular hysteresis of said shaft $H_a/m$ is at least 2°, where $H_a$ represents angular hysteresis of said disc as determined by the equation: $H_a = 360 \, (L/2-s-d)/\pi D$, and $m$ is the shaft-to-disc gear ratio.

The invention consists in the novel circuits, parts, constructions, arrangements, combinations, and improvements shown and described. The unique features and advantages of the invention will become apparent by reading of the following description which, taken in conjunction with the accompanying drawings which are incorporated in and constitute a part of the specification, discloses preferred embodiments thereof.

DESCRIPTION OF THE PREFERRED EMBODIMENT

Reference will now be made in detail to the present preferred embodiments of the invention, examples of which are illustrated in the accompanying drawings.

Figure 2:
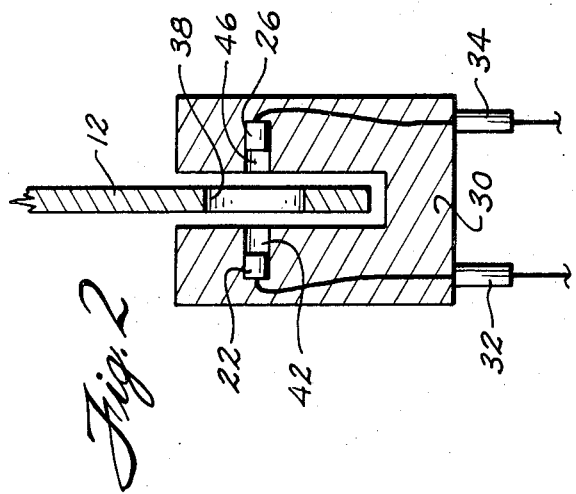
FIG. 2 is a partial cross-sectional view of the embodiment of FIG. 1 taken along line 2—2 thereof.
Figure 1:
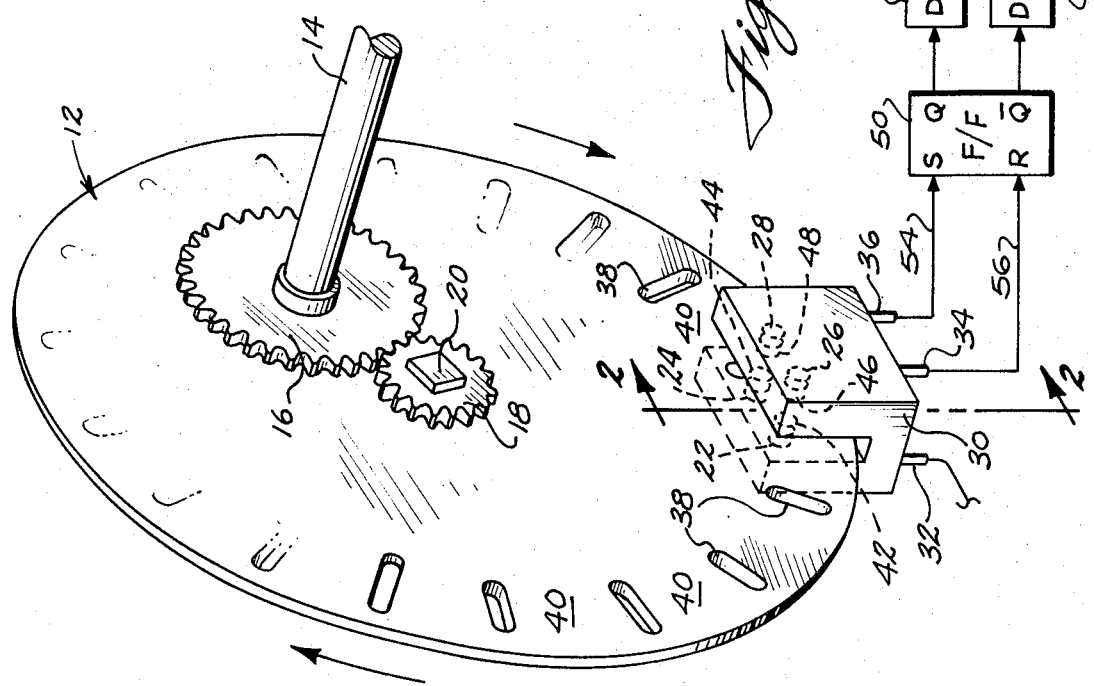
FIG. 1 illustrates the preferred embodiment of the invention in a partial perspective and electronic system presentation.

Referring now to the drawings, and in particular to FIGS. 1 and 2, there is shown apparatus for generating pulses in response to shaft rotation, indicated generally by number 10. In accordance with the invention, this apparatus 10 comprises an optical encoder including a disc coupled to the shaft, a pair of radiant energy sources positioned on one side of the disc, and a pair of radiant energy detectors positioned on the opposite side of said disc, each of said pair of radiant energy sources being in optical alignment with a respective one of said pair of radiant energy detectors. As embodied herein, the optical encoder includes a disc 12 coupled to shaft 14 so that the disc 12 rotates upon rotation of shaft 14. Preferably, the coupling between the shaft 14 and disc 12 is by gearing depicted here as gears 16 and 18. Gear 16 is mounted on shaft 14 and drives gear 18 connected to the disc 12 by a second shaft 20. The gear ratio is predetermined so that for each rotation of shaft 14 there is a predetermined rotation of disc 12. As an illustrative example, a gear ratio of 2:1 can be used so that for each revolution of the shaft 14, disc 12 undergoes two revolutions. The particular drive source to which shaft 14 is attached forms no part of the present invention, and can comprise such diverse structures as a fluid flowmeter or a mechanical computer, by way of example.

As here embodied, the optical encoder further includes radiant energy sources 22 and 24 and radiant energy detectors 26 and 28 mounted within housing 30. This housing has a generally U-shaped cross section with the sources 22 and 24 mounted in one leg and the detectors 26 and 28 mounted in the opposed leg. Preferably, source 22 is positioned on a line with detector 26, and source 24 is positioned on a line with detector 28 in order to attain optical alignment between these elements. Alternatively, the positioning of the sources and detectors shown in FIGS. 1 and 2 may be modified so that they are not mounted along a direct line as shown. Instead, conventional lens or prism arrangements could be used to insure this optical alignment across the housing 30. The sources and detectors are preferably rigidly mounted within the housing 30 so that their positions stay fixed under the vibrations and shocks encountered during operation. An example, as shown here, of a suitable shock-free mounting is the encapsulation of the sources and detectors within housing 30.

Preferably, radiant energy sources 22 and 24 comprise light sources, such as conventional lamps or lightemitting diodes, by way of example. Radiant energy detectors 26 and 28 are then formed as photosensitive detectors, examples being conventional photoelectric cells or phototransistors. The light sources are designed to be energized by a suitable source, such as a battery (not shown), connected to the terminals 32 of housing 30, one such terminal being shown in the figures. The output of detector 26 is connected to terminal 34 of housing 30 and the output of detector 28 is connected to terminal 36. If desired, suitable amplification means can be connected to the outputs of these two detectors and either encapsulated in housing 30 or coupled to the output terminals 34 and 36.

In accordance with the invention, the disc 12 includes a plurality of openings formed therein and equally spaced in a circle about said disc. As embodied herein, disc 12 is formed with a plurality of slots 38 in a circle at its periphery. The centers of the slots 38 form a circle having a constant radius originating at the center of the disc. The angular spacing between centers of adjacent slots is the same. Between each slot is an opaque area depicted by the numeral 40. Preferably, disc 12 is mounted so that during rotation the slots pass between the legs of housing 30. The slots 38 are positioned so that approximately their centers will intercept the lines between the sources and detectors. Any time a slot 38 passes between a light source and detector, a beam of radiant energy will be permitted to pass from that source to actuate the aligned detector. Similarly, the presence of an opaque area 40 between a source and detector blocks the passage of light.

In accordance with the invention, the optical encoder further includes means for confining the width of the beams radiated by said radiant energy sources, said confining means having a pair of spaced apertures through which the radiant energy beams are directed toward said detectors. As embodied herein, the confining means includes small apertures 42 and 44 formed in one leg of the housing 30 to provide openings for a small confined beam of light or other form of radiant energy to be emitted from each of the sources 22 and 24 toward the detectors 26 and 28, respectively. Similarly, spaced apertures 46 and 48 are formed in the opposed leg of housing 30 to form a confined opening for receipt of light at detectors 26 and 28, respectively. By controlling the width of the light beam, the accuracy of the system is enhanced.

In accordance with the invention, a bistable device is connected to the output of the pair of radiant energy detectors, and means are also provided for processing electrically the output of the bistable device to provide pulses proportional in number to rotation of shaft 14. As embodied herein, flip-flop 50 is connected to the outputs of detectors 26 and 28, and in turn the outputs of flip-flop 50 are connected to a processing circuit indicated generally by numeral 52. Preferably, the output of detector 28 is connected by a terminal 36 and line 54 to the Set input of flip-flop 50 and likewise the output of detector 26 is connected via terminal 34 and line 56 to the Reset or Clear input of this same flip-flop. The two outputs of flip-flop 50 are connected to differentiators 58 and 60 whose outputs are respectively connected to Schmitt triggers 62 and 64. The outputs of these Schmitt triggers are connected together via diodes 66 and 68 and applied to a totem pole circuit 70. The output of circuit 70 can be applied to a counter (not shown) or other suitable means for indicating shaft rotation, positioned either adjacent to the pulse generating apparatus 10 or, as shown, remote from the structure 72 housing this apparatus.

In operation, as shaft 14 and thereby disc 12 rotate, the slots 38 pass first between source 24 and detector 28 and then between source 22 and detector 26. As a slot 38 first passes source 24, a beam of light is directed from source 24 through this slot 38 and impinges upon detector 28. This detector provides an output on line 54 to set flip-flop 50. As this slot next passes between source 22 and detector 26, the light emitted from source 22 strikes detector 26 causing it to emit an output signal on line 56 to clear flip-flop 50.

Each output of flip-flop 50 is differentiated and applied to a separate Schmitt trigger to provide a timed pulse. Thus, when flip-flop 50 is set, the Q output is differentiated and a spike applied to Schmitt trigger 62 whose output in turn passes through diode 66 to trigger the totem pole circuit 70. When Schmitt trigger 62 returns to its original state as the spike decays, totem pole circuit 70 switches back to its original state. Thus, the setting of flip-flop 50 provides one output pulse. When flip-flop 50 is reset, its channel works in a similar manner to switch again totem pole circuit 70. Thus, a second output pulse is derived from the totem pole circuit 70 in response to the resetting of flip-flop 50. As described, each individual slot 38 which passes through both of the source/detector pairs causes the generation of two output pulses.

The use of two pair of light sources and detectors, together with the bistable circuit and appropriate processing circuitry, is to overcome the adverse effect of vibration and backlash of the shaft 14 during operation. As explained earlier, were a single light source and detector used, any bounce, vibration, or oscillation of the shaft which caused a disc slot 38 to move partially or wholly back into the source/detector line would permit another light beam to strike the detector to generate an extra pulse. Thus, two and perhaps more pulses would be generated by a single slot when, in fact, only one pulse should occur, resulting in a larger count and an erroneous indication of shaft rotation.

In certain types of environments where a shaft such as 14 is subjected to a start/stop manner of operation or to abrupt increases or decreases in shaft rotational speed, errors can still occur even where a dual source/detector system is employed. This is particularly true where the structure 72 housing the pulse generating apparatus is a fuel dispenser such as a gasoline dispenser used in gasoline stations. It has been found that a minimum predetermined hysteresis or immunity to backlash is critical to insuring accurate performance in computing the quantity and/or cost of dispensed fuel.

Hysteresis can be mechanically determined by turning the shaft 14 (FIG. 1) slowly so that light source 24 via aperture 44 causes a pulse to be applied by detector 28 to the Set side of flip-flop 50. Then, shaft direction is reversed and angular travel measured to the point where light source 22 via aperture 42 causes detector 26 to apply a pulse to the Reset side of flip-flop 50. The angle through which the shaft rotates in the reverse direction is the hysteresis of the shaft.

In accordance with the invention, the effective spacing between the apertures is approximately one-half the spacing between adjacent openings, and the spacing between the openings in said disc and the sizing of said openings and apertures are selected so that the angular hysteresis of the shaft $H_a/m$ is at least 2°, where $m$ is the shaft-to-disc gear ratio, and $H_a$ represents angular hysteresis of said disc as determined by the equation:

$$H_a = 360 \, (L/2 - s - d)/\pi D \quad (1)$$

Figure 3:
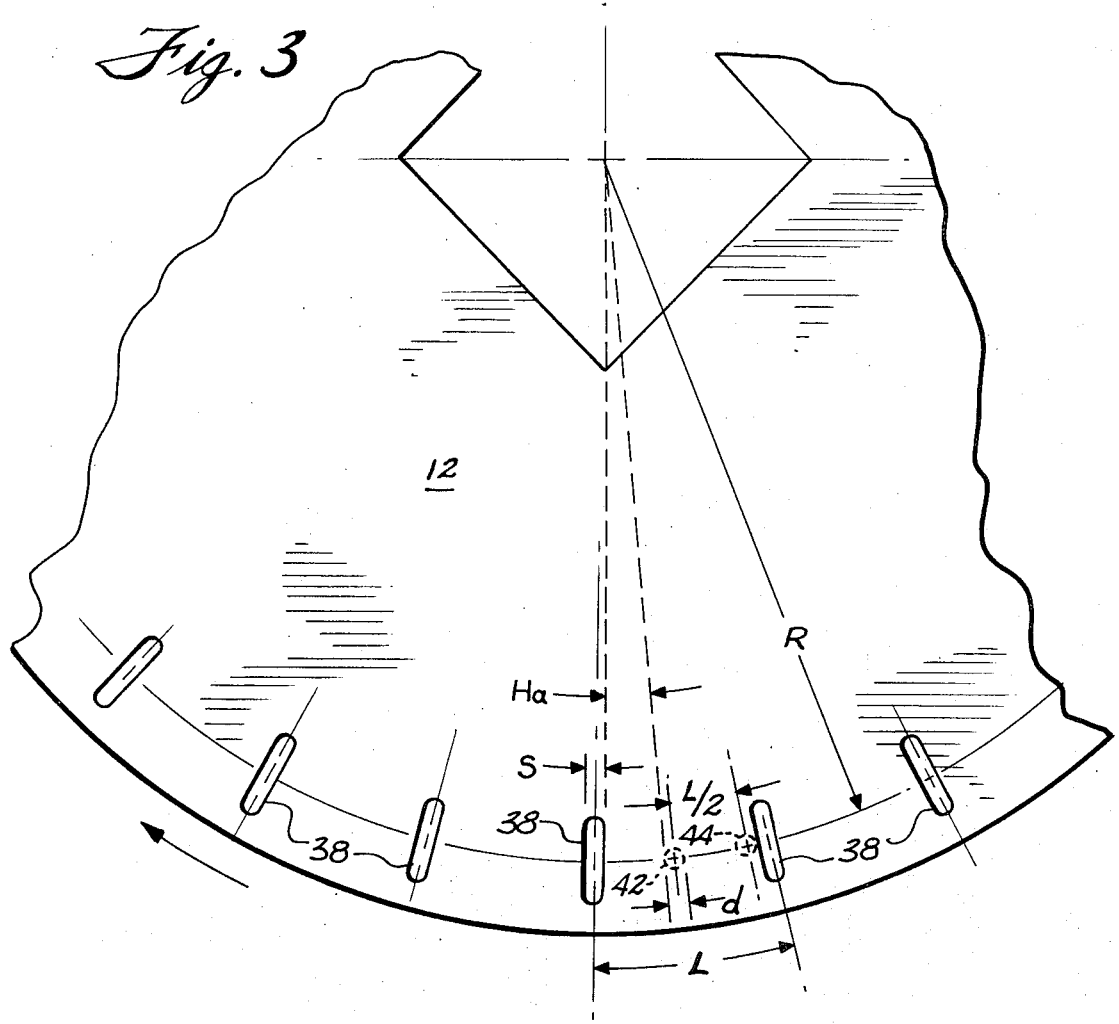
FIG. 3 is a partial view of the face of the disc used to illustrate the special positional and sizing requirements of certain apparatus of the invention.

As embodied herein, and with reference to FIG. 3, $L$ is the distance between the centers of adjacent slots 38 measured along the circle of radius $R$, $s$ is the width of a slot 38, and $d$ is the width of an aperture 42 or 44, or where the aperture is a circle, the diameter of such aperture. Apertures 42 and 44 have been superimposed upon the disc 12 as an aid in describing the invention. The distance between centers of these apertures is approximately one-half the distance between centers of adjacent slots measured along the circle of radius $R$. Preferably, the width of the light source apertures 42 and 44 and the detector apertures 46 and 48 are substantially the same.

A hysteresis of 2° is a critical minimum. As shown by equation (1), hysteresis is a direct function of slot width and of light source (and detector) apertures. Where a large number of slots 38 are formed in a disc 12 reducing the spacing 40 between the slots, it is important that the size of the slots 38 and apertures 42 and 44 be kept small because hysteresis is degraded very rapidly as slot and aperture dimensions are increased. However, one must avoid making the slot and aperture size so small that an insufficient quantity of light is beamed to a detector during the passage of a slot 38 between a light source and detector.

When the shaft 14 is directly coupled to the disc 12 and no gearing is used, the angular hysteresis of the shaft is the same as the angular hysteresis of the disc. However, where gearing is used to couple the shaft 14 to disc 12, the angular hysteresis computed for the disc must be divided by the shaft-to-disc gear ratio. For example, if the shaft-to-disc gear ratio is 2:1, meaning there are twice as many teeth on the shaft gear 16 as on the disc gear 18, then the angular hysteresis computed for the disc must be divided in half to get shaft hysteresis. Similarly, if the shaft-to-disc gear ratio were 1:2, then the disc hysteresis would be doubled to obtain shaft hysteresis.

Equation (1) serves as a valuable aid in obtaining maximum utilization of space and size limitations for the pulse generating apparatus 10 where still operating within the constraint of a 2° minimum hysteresis. Thus, in following the teachings of the present invention, proposed designs can be verified prior to production to see if the minimum hysteresis requirements are met. Present below are two examples using equation (1) as a design verification.

EXAMPLE 1

Assume a requirement of 100 pulses per shaft revolution and a disc diameter no greater than 2 inches. 25 slots are selected for the disc and a gear coupling is chosen, $m = 2$. Assume the disc has an effective $R$ of 0.79 inch (FIG. 3), so that $D = 1.58$ inches. Each slot width $s = 0.02$ inch, and each light source aperture $d$ 32 0.02 inch. The distance $L$ between slots is:

$$L = \pi D/N \quad (2)$$

where $N$ = number of slots. From equation (1):
$H_a = 360 \, (1.58 \, \pi/ \, 2(25) - 0.02 - 0.02)/1.58 \, \pi$,
$H_a = 4.3°$, $H_a/m = 2.15°$.

This particular design is acceptable because the hysteresis of the shaft exceeds 2°.

EXAMPLE 2

Assume here that the requirements and dimensions are the same as Example 1 except the width of the apertures has been increased to 0.06 inch. From equations (1) and (2):

$H_a = 360 \ (1.58 \ \pi / \ 2(25) - 0.02 - 0.06)/1.58 \ \pi$,
$H_a = 1.4°$,
$H_a/m = 0.7°$.

This particular design is not acceptable because the hysteresis of the shaft is less than 2°. This example by the way shows the criticality of the design dimensions where an increase in light aperture size of 0.04 inch caused the apparatus to fall well outside of the minimum hysteresis requirement. Such would have been the case even if the shaft 14 had been directly coupled to the disc 12.

With reference again to FIG. 1, the output of the totem pole circuit 70 would be normally directed to a counter, as mentioned previously, where the generated pulses would be accumulated. The final count attained when shaft 14 stopped would be proportional to the total number of revolutions that the shaft had undergone. For example, if shaft 14 rotates in response to a flowmeter used in the dispensing of fuel, then the count would be proportional to the volume of fuel dispensed. Similarly, if shaft 14 were coupled to a mechanical computer which computes the cost of the dispensed fuel, the final count would be indicative of the total cost of this fuel.

Where the generated pulses are transmitted by wire or other means to a remote point, there is the possibility of noise pulses and similar unwanted signals being picked up depending upon the environment in which the pulse generating apparatus is used. As an example, in a gasoline station, the pulses which are generated can be transmitted by wire underground from the dispenser to the station house for counting and display. In this environment, electromagnetic interference and even large static charges can be generated by ignition systems, motors, and other apparatus normally found in such stations, and the wiring is particularly susceptible to having noise signals induced therein by reason of their proximity to stray fields created by the electromagnetic radiation. These noise signals can be of a positive or negative character with respect to ground and of varying duration and amplitude, all dependent upon the effect caused in the wires by the influence of one or more sources of electromagnetic radiation or static charges. One particularly adverse result is that these noise signals, once induced, can be applied to the counter and because they appear as pulses to the counter, are counted to give an erroneous total. Thus, the volume or the price which is displayed is greater than the volume or price of the fuel which has actually been dispensed.

Figure 4:
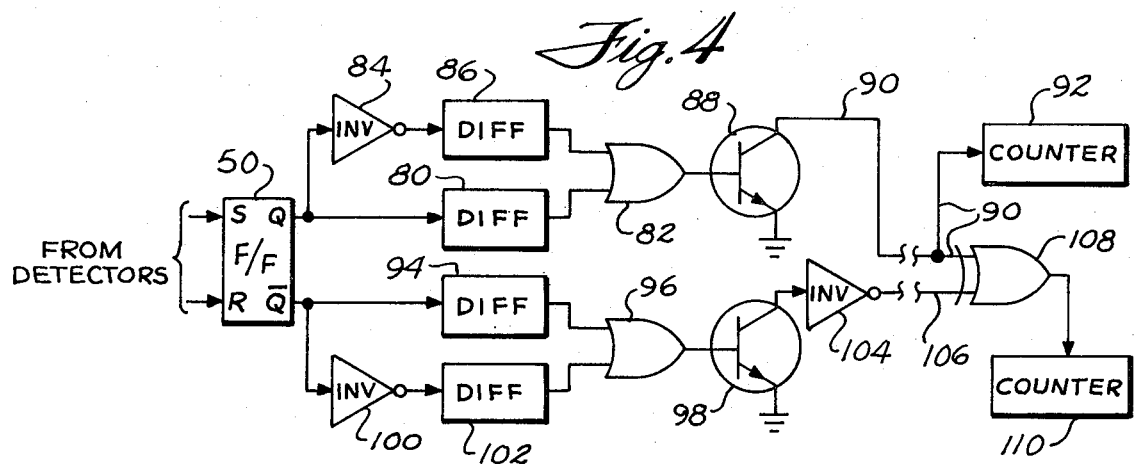
FIG. 4 is an alternative embodiment of the electronic system used in FIG. 1.

With reference now to FIG. 4, there is shown a circuit embodiment for detecting the occurrence of these noise signals so that they will have only a minimum effect upon the counting circuit. Preferably, the outputs of flip-flop 50 are connected into two separate channels having, except in one respect, the same construction. In the upper channel, the Q output is connected to a differentiator 80 whose output is applied to OR gate 82. The Q output is also applied to an inverter 84. The output of inverter 84 is applied to a second differentiator 86 and its output, in turn is applied to the other input of OR gate 82. The output of OR gate 82 is connected to the base of a drive transistor 88. The output of this transistor is applied to output line 90.

In the operation of the aforedescribed channel, any time flip-flop 50 changes state either by the application of a Set or Reset pulse from the detectors, a pulse will be applied on output line 90. All pulses will be of the same polarity. For example, when the Q output goes True in response to the setting of flip-flop 50, this transition is differentiated at 80, applied through OR gate 82 to transistor 88, and a positive spike or pulse is applied onto line 90. When the Q output of flip-flop 50 goes False in response to a Reset pulse being applied by a detector, this new transition is first inverted at inverter 84 and then differentiated and applied through OR gate 82 to transistor 88. Again, a positive pulse is applied on output line 90. It is thus seen that the output of transistor 88 is the same as the output of the totem pole circuit 70 of FIG. 1 because each slot 38 of disc 12 causes the generation of two pulses at the output of the pulse generating apparatus. These pulses are carried by line 90 to a remote counter 92 where they are counted and displayed.

In the lower channel, the $\bar{Q}$ output goes True when flip-flop 50 is Reset and this transition is differentiated at differentiator 94 and applied through OR gate 96 to the base of transistor 98. The output of transistor 98 is inverted by inverter 104 and applied onto output line 106. When the $\bar{Q}$ output goes False in response to flip-flop 50 being Set, this new transition is inverted at inverter 100, differentiated at differentiator 102 and applied through OR gate 92 to transistor 98. The pulse out of transistor 98 is also inverted at inverter 96 and applied onto output line 106. Thus, as in the case of the upper channel, the lower channel also generates two output pulses for each slot 38 of disc 12. All of the output pulses which are generated on output line 106 during rotation of shaft 14 coincide in time with the pulses generated on output line 90 except that the pulses on line 106 are logically inverted from those on line 90. Line 106 is carried with line 90 to the remote point where they are both applied to one input of an Exclusive-OR gate 108. The output of this gate is connected to the input of the second counter 110.

In the absence of a noise signal being injected or induced in lines 90 and 106, the Exclusive-OR gate will not change states because the signals on these lines are always the logical inverse of each other. Accordingly, no count is registered in counter 110. If a noise signal caused by any of the effects discussed previously is induced or injected into either of the output lines 90 or 106, it is also induced in the other as well. This is because the lines are intentionally positioned adjacent one another between the dispenser and the remote counter 92, preferably as part of the same cable or in a common conduit. Thus, any noise signals are induced in both output lines 90 and 106 simultaneously and will be of essentially the same level and polarity. When such noise signal arrives at the remote point via line 90, it is counted at counter 92.

At the Exclusive-OR gate, this noise pulse is applied by lines 90 and 106 to both inputs simultaneously and causes the logic level at one of these inputs but not the other to change state. This is readily seen because normally the signals on line 90 and 106 are logically inverted. Thus, assuming that the polarity of the signal on line 90 is True and a True noise pulse is induced in this line, the logic state on that line is unchanged. However, at line 106 the logic level is False and when the True noise pulse is induced in that line, it changes its logic state to True. Thus, both inputs to Exclusive-OR gate 108 are now True and its output changes state. A count is recorded in counter 110. The relationship just described holds whether or not the noise signal which is induced is of a positive or negative polarity and whether it occurs simultaneously with a pulse applied by the pulse generating apparatus or between such pulses. In all cases, the inputs to the Exclusive-OR gate 108 will change from a state where the inputs are logically inverted to one where the inputs are of the same logic level. Thus, the Exclusive-OR gate 108 in each instance of the receipt of a noise pulse will advance counter 110.

The output of counter 110 can be used in any number of conventional ways to indicate that false counts are being recorded in counter 88. For example, after a predetermined number of counts are recorded, a lamp or other indicator can be actuated; or, alternatively, the output of counter 110 could be applied to counter 92 to blank out its display circuitry. In such case, the counter 92 cannot be used, and instead the computer associated with the fuel dispenser containing the pulse generating apparatus 10 would be relied upon.

It will become apparent from a reading of the description of the embodiment of FIG. 4 that the processing circuitry of FIG. 1 can also be used in the detection of noise pulses. To this end, the output of totem pole circuit 70 is connected to output line 90. The output of circuit 70 is also inverted and applied on output line 106. As in the embodiment of FIG. 4, two pulse trains are generated, one being the logical inverse of the other. The operation of counters 92 and 110 and Exclusive-OR gate 108 are the same as has just been described in respect to FIG. 4.

It will now become apparent to those skilled in the art that various modifications and variations can be made in the inventive system described herein without departing from the scope or spirit of the invention.

What is claimed is:

1. Apparatus for generating pulses in response to shaft rotation comprising:
   a. an optical encoder including
      1. a disc coupled to said shaft, said disc including a plurality of openings formed therein and equally spaced in a circle about said disc,
      2. a pair of radiant energy sources positioned on one side of said disc,
      3. a pair of radiant energy detectors positioned on the opposite side of said disc, each of said pair of radiant energy sources being in optical alignment with a respective one of said pair of radiant energy detectors,
      4. and means for confining the width of the beams radiated by said radiant energy sources, said confining means having a pair of spaced apertures through which the radiant energy beams are directed towards said detectors,
   b. a bistable device connected to the output of said pair of radiant energy detectors,
   c. means for processing electrically the outputs of said bistable device to provide pulses proportional in number to shaft rotation,
   d. the effective spacing between the apertures being approximately one-half the spacing between adjacent openings, and
   e. the spacing between said openings and the sizing of said openings and apertures being selected so that the angular hysteresis of said shaft $H_a/m$ is at least 2°, where $H_a$ represents angular hysteresis of said disc as determined by the equation: $H_a = 360 (L/2 - s - d)/D$, and $m$ is the shaft-to-disc gear ratio, and where $L$ is the spacing between the centers of adjacent openings measured along a circle of radius $R$, $s$ is opening width, $d$ is aperture width, and $D = 2R$.

2. Apparatus as claimed in claim 1 further comprising a U-shaped housing, the radiant energy sources being mounted in one leg of the housing and the radiant energy detectors being mounted in the opposed leg of the housing.

3. Apparatus as claimed in claim 2 wherein the sources and detectors are rigidly mounted within the housing so that their positions stay fixed under the vibrations and shocks encountered during operation.

4. Apparatus as claimed in claim 2 wherein said radiant energy sources are mounted within said one leg of said housing and said confining means includes a pair of apertures formed in said one leg to provide openings for a confined beam of radiant energy to be emitted from each of said sources, and wherein said radiant energy detectors are mounted within said opposed leg of said housing and further comprising a second pair of apertures formed in said opposed leg to form a confined opening for receipt of a beam of radiant energy at each of said detectors.

5. Apparatus as claimed in claim 4 wherein said radiant energy sources are light sources and said radiant energy detectors are photosensitive detectors.

6. Apparatus as claimed in claim 5 wherein said openings are slots formed in the disc in a circle at its periphery, the centers of the slots forming a circle of constant radius originating at the center of the disc.

7. Apparatus as claimed in claim 6 combined with a fuel dispenser wherein the generated pulses are proportional to dispensed fuel.

* * * * *